UNITED STATES PATENT OFFICE.

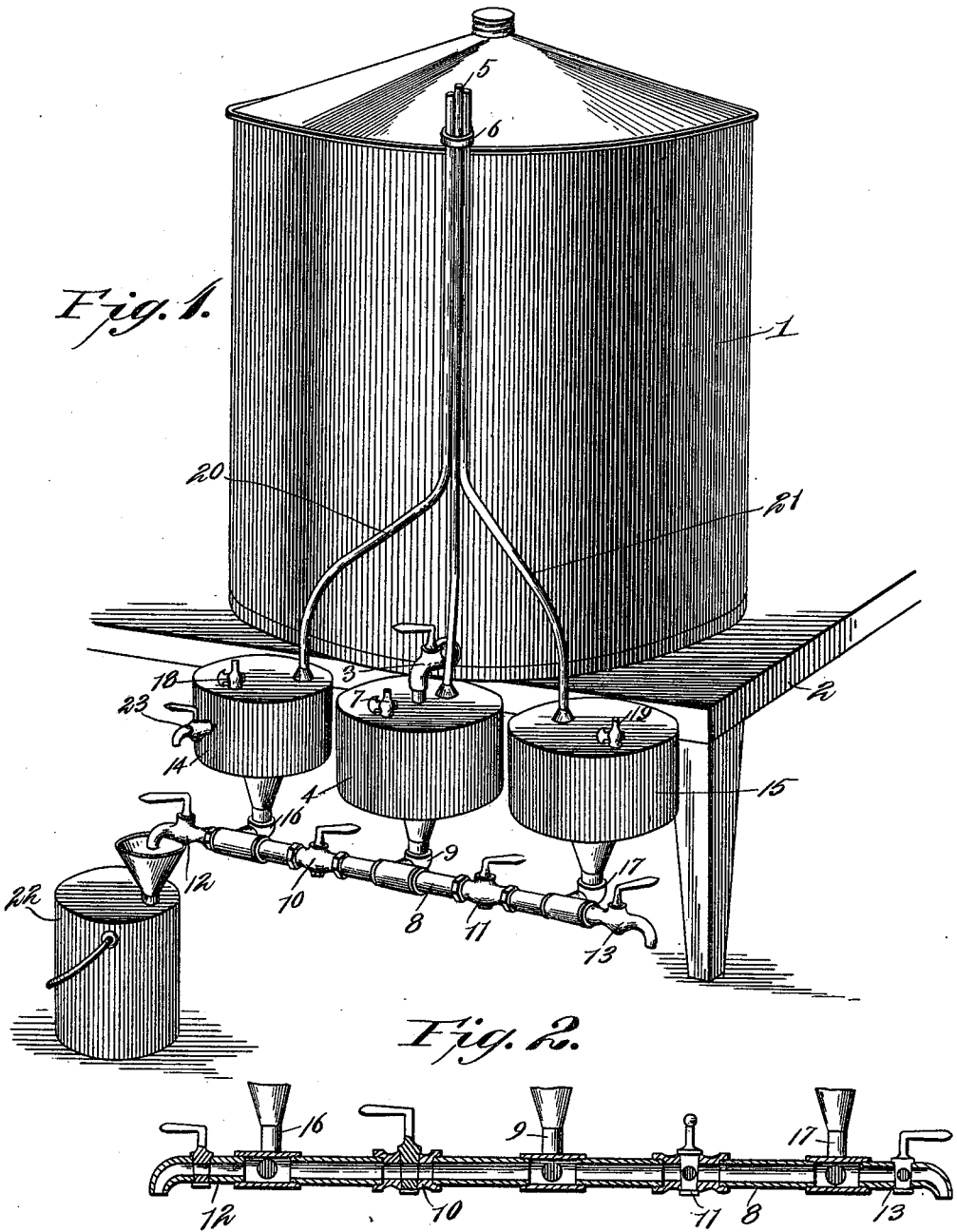

SUMNER PEASE, OF GENEVA, OHIO, ASSIGNOR OF TWO-THIRDS TO FRANK S. TURNER, OF SAME PLACE.

MEASURING DEVICE FOR LIQUIDS.

SPECIFICATION forming part of Letters Patent No. 675,290, dated May 28, 1901.

Application filed August 27, 1900. Serial No. 28,189. (No model.)

*To all whom it may concern:*

Be it known that I, SUMNER PEASE, a citizen of the United States, residing at Geneva, in the county of Ashtabula and State of Ohio, have invented a new and useful Measuring Device, of which the following is a specification.

This invention relates to measuring devices for liquids, and has for its object to provide an improved device of this character which is especially designed for measuring kerosene-oil and gasolene and arranged to deliver certain predetermined quantities without requiring the accurate attention of an attendant. It is furthermore designed to provide for delivering to more than one vessel at a time and to have the device under complete control, so that there may be no waste and actual contact with the oil is obviated.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a perspective view of a measuring device constructed in accordance with the present invention. Fig. 2 is a longitudinal sectional view taken through the distributing-pipe and showing the means for controlling the communication between the respective measuring vessels and the common distributing-pipe.

Corresponding parts are designated by like characters of reference in both figures of the drawings.

Referring to the drawings, 1 designates any ordinary tank or reservoir for containing the bulk of the liquid, and it is supported in a slightly-elevated position by means of a stand or other suitable support 2. At the bottom of this tank and in one side thereof there is provided a faucet 3, forming a connection between the tank and a two-gallon measuring can or vessel 4, located slightly below the bottom of the tank, so that the contents thereof may readily discharge into the can. In the top of this can, which is entirely closed, there is provided a vent-pipe 5, which extends to the top of the tank, where it is secured by a suitable collar 6. A petcock 7 is also placed in the top of the can, so as to readily determine whether or not the latter is full. Located horizontally beneath the measuring-can is a distributing-pipe 8, to the intermediate portion of which the can 4 is connected by means of an elbow 9. At opposite sides of the elbow there are provided the stop cocks or valves 10 and 11, respectively, whereby communication from the can may be controlled in opposite directions. At the opposite ends of the distributing-pipe there is provided the opposite faucets or valves 12 and 13 for discharging the liquid from the pipe.

Located between the respective terminal faucets and the adjacent stop-cocks are the measuring cans or vessels 14 and 15, respectively. The can 14 has the capacity of one gallon, and the other can has a capacity of two gallons, and they are connected to the common distributing-pipe by means of the respective elbows 16 and 17. These cans are furthermore provided with the petcocks 18 and 19 and the vent-pipes 20 and 21, which are supported by the common ring or collar 6.

In using the device the terminal valves 12 and 13 are closed and the intermediate stop-cocks are opened, after which the valve 3 is opened, so that the liquid contents of the tank may flow into the central measuring-can and thence in opposite directions through the distributer-pipe to the opposite outer cans. When the measuring-cans have become filled, the valve 3 is shut off, so as to discontinue the supply. Should it be desired to draw off one gallon, a suitable vessel 22 is placed under the faucet 12, after which the stop-cock 10 is closed and the faucet 12 opened, whereby the contents of the measuring-can 14 will be drawn off into the vessel without disturbing the other measuring-cans. By a similar manipulation of the valve 13 and the stop-cock 11 the contents of the opposite terminal can may be drawn off. Also the combined contents of the intermediate measuring vessel and either of the others may be drawn off by opening the stop-cock between said vessels. Moreover, the contents of the two terminal vessels may be drawn off at the same time by closing one or both of the stop-cocks and opening the two terminal valves.

It will of course be understood that the measuring vessels may be of any preferred capacity; but the arrangement herein described is preferable for the retail trade in oils and gasolene.

In order that a half-gallon may be obtained, one of the terminal measuring vessels is provided with a faucet 23, preferably the one-gallon vessel, the faucet being arranged midway between the top and bottom of the vessel, so as to draw off the upper half of its contents through this faucet and independently of the distributer-pipe.

From the foregoing description it will be seen that certain predetermined quantities of liquid are always measured off, so that different quantities may be quickly drawn off without requiring accurate attention to a measuring vessel.

What is claimed is—

In a measuring device of the class described, the combination with a supply tank or reservoir, of opposite end measuring vessels, and an intermediate measuring vessel, a valved connection between the intermediate vessel and the tank, a common horizontal distributer-pipe located beneath the vessel, separate connections between the respective vessels and the pipe, terminal discharge-valves at opposite ends of the pipe, and stop-cocks carried by the pipe and located between the intermediate vessel and the respective end vessels.

In testimony that I claim the foregoing as my own I have hereto affixed my signature in the presence of two witnesses.

SUMNER PEASE.

Witnesses:
 H. A. FARD,
 A. J. SEARLE.